United States Patent
Han et al.

(10) Patent No.: US 10,880,749 B2
(45) Date of Patent: *Dec. 29, 2020

(54) BLOCKING COMMUNICATION BETWEEN ROGUE DEVICES ON WIRELESS LOCAL ACCESS NETWORKS (WLANS)

(71) Applicant: Fortinet, Inc., Sunnyvale, CA (US)

(72) Inventors: Sung-Wook Han, Sunnyvale, CA (US); Mohan Ram, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/907,279

(22) Filed: Feb. 27, 2018

(65) Prior Publication Data

US 2018/0262911 A1    Sep. 13, 2018

Related U.S. Application Data

(63) Continuation of application No. 15/147,797, filed on May 5, 2016, now Pat. No. 9,980,145, which is a continuation of application No. 13/358,401, filed on Jan. 25, 2012, now Pat. No. 9,351,166.

(51) Int. Cl.
*H04W 12/12* (2009.01)
*H04L 29/06* (2006.01)

(52) U.S. Cl.
CPC .......... *H04W 12/12* (2013.01); *H04L 63/10* (2013.01); *H04L 63/1416* (2013.01); *H04L 63/1483* (2013.01)

(58) Field of Classification Search
None
See application file for complete search history.

(56) References Cited

U.S. PATENT DOCUMENTS

| | | |
|---|---|---|
| 2006/0165073 A1 | 7/2006 | Gopinath et al. |
| 2008/0101283 A1 | 5/2008 | Calhoun et al. |
| 2008/0107065 A1 | 5/2008 | Lescuyer et al. |
| 2008/0186932 A1 | 8/2008 | Do et al. |
| 2009/0235354 A1 | 9/2009 | Gray et al. |
| 2009/0271864 A1* | 10/2009 | Dietrich ............... H04L 63/10 726/23 |
| 2010/0299725 A1* | 11/2010 | Yamada ............... H04L 1/1607 726/4 |

* cited by examiner

*Primary Examiner* — Peter Chen
*Assistant Examiner* — Jeff Banthrongsack
(74) *Attorney, Agent, or Firm* — Law Office Of Dorian Cartwright; Dorian Cartwright

(57) ABSTRACT

Techniques which prevent rogue devices from continued access to a wireless communication system. A control element directs access points as to which mobile stations to service. Each access point maintains a record of the mobile stations it is servicing. At the direction of the control element, one or more access points send ACK (acknowledgement) messages when hearing messages from a rogue device. When the rogue device sends a message, it expects an ACK message in response, but those additional ACK messages interfere with the responsive ACK message, causing the rogue device to never hear the responsive ACK message. The rogue device assumes its message was not received, so it retries sending of that message. When the rogue device retries sending of its message, the responsive ACK message is similarly interfered with, until the rogue device concludes that its connection has been lost.

11 Claims, 2 Drawing Sheets

BLOCKING COMMUNICATION BETWEEN ROGUE DEVICES ON WIRELESS LOCAL ACCESS NETWORKS (WLANS)

CROSS-REFERENCE TO RELATED APPLICATIONS

This application is a continuation of U.S. patent application Ser. No. 15/147,797 filed May. 5, 2016, entitled BLOCKING COMMUNICATION BETWEEN ROGUE DEVICES ON WIRELESS LOCAL ACCESS NETWORKS (WLANS) by Sung-Wook Han et al., which is a continuation of U.S. patent application Ser. No. 13/358,401 filed Jan. 25, 2012, entitled BLOCKING COMMUNICATION BETWEEN ROGUE DEVICES ON WIRELESS LOCAL ACCESS NETWORKS (WLANS) by Sung-Wook Han et al., now issued U.S. Pat. No. 9,351,166, which is related to U.S. Pat. No. 7,826,426, issued to Vaduvur Bharghavan et al. and entitled "Seamless Mobility in Wireless Networks," the entire contents of which are hereby incorporated by reference.

FIELD OF THE INVENTION

The present invention relates generally, to wireless networks, and more specifically, to blocking rogue devices on a wireless network.

BACKGROUND

In wireless communication systems, it sometimes occurs that devices attempt to use the communication system without authorization. Unauthorized devices might include devices which (1) simply have no formal authorization for use of the wireless media, (2) are usurping communication system resources, such as communication bandwidth or access point channels, or (3) are actively attempting to compromise system security, such as by listening in on wireless communication traffic or by spoofing legitimate communication system devices.

Known methods of preventing rogue devices from continued access to the communication system include, once rogue devices are identified, sending a "de-authorization" message to the rogue mobile station, causing the rogue mobile station to re-associate itself with the access point servicing it. If the access point servicing that rogue mobile station is itself a rogue access point, the de-authorization message is spoofed to allegedly originated from the rogue access point. A recently proposed IEEE standard, 802.11w, proposes that management frames between the access point and the mobile station are protected, such as by a unique signature. This would make it more difficult for access points that are part of the communication system to de-authorize rogue mobile stations or rogue access points.

BRIEF SUMMARY

A method, system and computer program product for preventing rogue devices from continued access to a wireless communication system is provided.

In one embodiment, a control element for the wireless communication system directs access points as to which mobile stations those access points will service. Each access point maintains a record of the mobile stations it is servicing, exchanging messages with those mobile stations. Each access point sends an ACK (acknowledgement) message to those mobile stations it is servicing, whenever it hears a message from one of those mobile stations. In one embodiment, at the direction of the control element, one or more access points also send additional ACK messages when hearing messages from a rogue device.

When the rogue device sends a message, it expects an ACK message in response, but those additional ACK messages interfere with the responsive ACK message, causing the rogue device to never hear the responsive ACK message. This has the effect that the rogue device assumes its message was not received, so it retries sending of that message. When the rogue device retries sending of its message, the responsive ACK message is similarly interfered with, until the rogue device concludes that its connection has been lost. Without the ability to receive responsive ACK messages, the rogue device is unable to send messages to any other device in the communication system.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Generality of the Description

Figure 1:
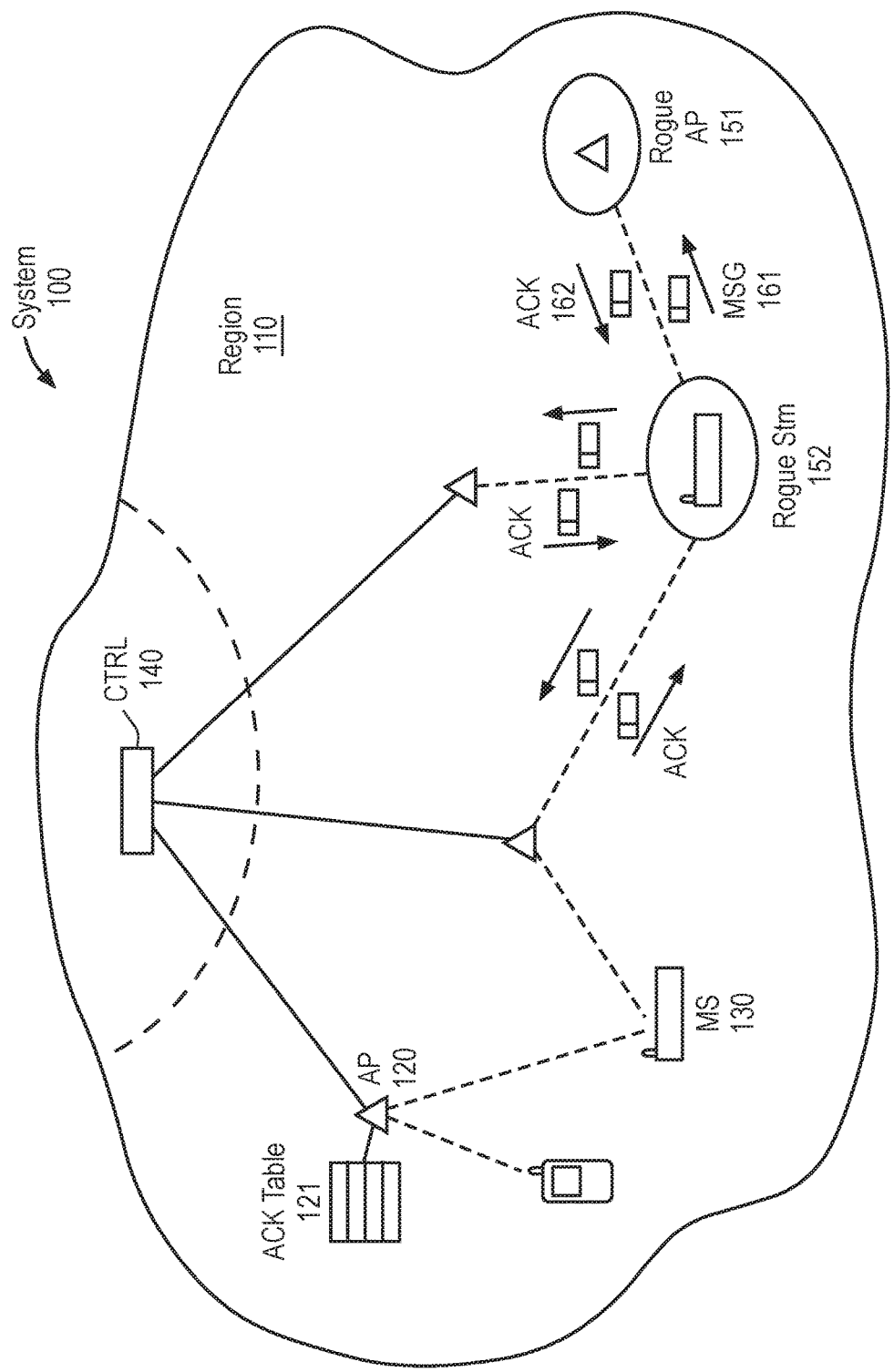
FIG. 1 shows a conceptual diagram of a wireless communication system.

Technologies shown or suggested by this description should also be thought of in their most general possible form. This includes, without limitation, the following:

The text "constantly," "continually," "from time to time," "occasionally," "periodically", and similar phrases and terms, generally indicates any case in which a method or technique, or an apparatus or system, operates over a duration of time, including without limitation any case in which that operation occurs only part of that duration of time. For example and without limitation, these terms would include, without limitation, methods which perform an operation as frequently as feasible, on a periodic schedule such as once per second or once per day, in response to an alarm or trigger such as a value reaching a threshold, in response to a request or an implication of a request, in response to operator intervention, otherwise, and to combinations and conjunctions thereof.

The text "in one embodiment," "one embodiment," and similar phrases and terms, generally indicates that a particular characteristic, feature, or structure, described herein is included in at least one embodiment of the invention. Uses of these phrases herein do not necessarily all refer to the same embodiment. Rather, the specific concepts described herein might be combined in any suitable manner into one or more distinct possible embodiments.

The text "methods, physical articles, and systems," "techniques", and similar phrases and terms, generally indicates any material suitable for description, including without limitation all such material within the scope of patentable subject matter, or having ever been considered within the scope of patentable subject matter, or which might colorably be within the scope of patentable subject matter, notwithstanding most recent precedent.

The text "relatively", and similar phrases and terms, generally indicates any relationship in which a comparison is possible, including without limitation "relatively less," "relatively more," and the like. In the context of the invention, where a measure or value is indicated to have a relationship "relatively," that relationship need not be precise, need not be well-defined, need not be by comparison with any particular or specific other measure or value. For example and without limitation, in cases in which a measure or value is "relatively increased" or "relatively more," that comparison need not be with respect to any known measure or value, but might be with respect to a measure or value held by that measurement or value at another place or time.

The text "substantially", and similar phrases and terms, generally indicates any case or circumstance in which a determination, measure, value, or otherwise, is equal, equivalent, nearly equal, nearly equivalent, or approximately, what the measure or value is recited. The terms "substantially all" and "substantially none" and similar phrases and terms, generally indicate any case or circumstance in which all but a relatively minor amount or number (for "substantially all") or none but a relatively minor amount or number (for "substantially none") have the stated property. The terms "substantial effect" and similar phrases and terms, generally indicate any case or circumstance in which an effect might be detected or determined.

The text "this application," "this description", and similar phrases and terms, generally indicates any material shown or suggested by any portions of this application, individually or collectively, including all documents incorporated by reference or to which a claim of priority can be made or is made, and include all reasonable conclusions that might be drawn by those skilled in the art when this application is reviewed, even if those conclusions would not have been apparent at the time this application is originally filed.

The invention is not in any way limited to the specifics of any particular examples disclosed herein. After reading this application, many other variations are possible which remain within the content, scope and spirit of the invention; these variations would be clear to those skilled in the art, without undue experiment or new invention.

Terms and Phrases

The following terms and phrases include their most general applicable form. Each is described in a manner that is illustrative, not limiting.

The text "access point", "AP", and variants thereof, generally refers to any device capable of coupling wireless messages between a mobile station (or any other wireless device) and a wired communication medium. Access points might be coupled directly to a wired medium, such as for example a LAN or other wired network. Alternatively, access points might be coupled using a technique other than a wired medium, such as for example using other access points, wireless repeaters, or otherwise. For example and without limitation, one or more access points might be coupled to the communication system entirely using wireless communication techniques, which might themselves use an IEEE 802.11 protocol or a variant thereof.

The text "hear" and variants thereof, when used with respect to a wireless message, generally refers to detecting that message at a recipient. For example and without limitation, access points might "hear" messages by detecting their associated electromagnetic effects at a receiving antenna. An access point might hear messages that are directed to it, or which are directed to some other device.

The text "mobile station," "station," "wireless station", and variants thereof, generally refers to any end-user device capable of communicating using wireless messages in a wireless communication system. For example and without limitation, wireless stations might include cellular phones, laptop computers, netbooks (such as the "iPad"), or other devices. Mobile stations might or might not be physically mobile, or might or might not be physically stationary.

The text "rogue device," "unauthorized device", and variants thereof, generally refers to any device attempting to use a wireless communication system without authorization. Rogue devices can include devices acting as mobile stations ("rogue mobile stations" or "rogue stations"), or access points ("rogue access points"). Unauthorized devices can include devices which are (1) not formally authorized, (2) are using system resources without permission, (3) are attempting to subvert system security, or otherwise.

The text "wireless communication", "wireless network", and variants thereof, generally refers to any method or system in which data or messages are sent, received, or maintained, using a wireless medium. For example and without limitation, the wireless medium might include electromagnetic radiation, such as radio frequencies. In one embodiment, wireless communication is performed using a communication protocol family such as IEEE 802.11, or a variant thereof. However, in the context of the invention, there is no particular requirement for any such limitation. For example, wireless communication might be performed using any technique not tethered by wire.

FIGURES AND TEXT

FIG. 1

FIG. 1 shows a conceptual diagram of a wireless communication system.

A wireless communication system 100 includes elements shown in the FIG. 1, including one or more communication channels 110, one or more access points 120, one or more mobile stations 130, one or more control elements 140, and possibly other elements. As further described herein, the communication system 100 might also be unwitting host to one or more rogue devices, including possibly one or more rogue access points 151 and one or more rogue stations 152.

The communication system 100 provides for messages 161 to be sent and received by devices coupled to one of the channels 110. A sending device sends its messages 161 to destination devices, which respond to indicate that the messages 161 are received by sending ACK (acknowledgement) messages 162 back to the sending device. The rogue devices attempt to send and receive messages 161 without authorization by the communication system 100.

Each communication channel 110 includes a physical communication layer, such as a frequency band in which electromagnetic signals are exchanged using a known communication protocol. In one embodiment, the communication protocol includes an IEEE 802.11 protocol transport layer, or a variant thereof. The physical communication layer provides devices coupled to the communication system 100 the ability to exchange messages 161 with at least some other devices coupled to the communication system 100. Wireless communication is conducted on each channel 110 using wireless messages 161 which are transmitted by the sender and received at one or more other devices. The messages 161 are transmitted using electromagnetic signals, such as radio frequency signals, which are emitted by an antenna at the sender and detected using an antenna at those one or more other devices.

As described herein, devices using the communication system 100 might "hear" messages 161, where that the term "hear", as described herein, generally refers to detecting that message 161, such as detecting the message's electromagnetic effects at a receiving antenna. A device might hear messages 161 that are directed to it, or which are directed to some other device. For example, when a mobile station 130 sends a message 161 to its servicing access point 120, more than one nearby access point 120 might hear that message 161. Those other access points 120 would examine the message 161, determine that they were not servicing that mobile station 130, and conclude that they should not respond.

The access points 120 are coupled to the control element 140, such as by direct wired connections, such as for example being coupled to the same LAN or other network. In alternative embodiments, the access points 120 may be coupled to the control element 140 using wireless connections. For one example, a first access point 120 might be coupled to a second access point 120 using a wireless connection, where the second access point is coupled to the control element 140 using a wired connection. For another example, an access point 120 may be coupled to the control element 140 using a direct wireless connection.

In operation of the communication system 100, access points 120 exchange wireless messages 161 with mobile stations 130. Whenever an access point 120 detects a message 161, that access point 120 determines if it should process the message 161 (either by forwarding that message 161 or by responding by itself), and if so, that access point 120 acknowledges the message 161 by responding with an ACK (acknowledgement) message 162. Similarly, whenever a mobile station 130 detects a message 161, that mobile station 130 determines if the message 161 is directed to it, and if so, that mobile station 130 acknowledges the message 161 by responding with an ACK message 162. In many communication protocols, every message 161 (other than ACK messages 162 themselves) involves a responsive ACK message 162, so the original sender knows the message 161 was received.

"Virtual Cell" and "Virtual Port" Systems

In a system as described in the Incorporated Disclosures, association between access points 120 and mobile stations 130 is directed by the control element 140. The control element 140 instructs each access point 120 regarding which mobile stations 130 to service. Each mobile station 130 is informed by the control element 140 regarding to which BSSID (basis service set identifier) it should use to exchange messages with its assigned access point 120. From time to time, the control element 140 directs particular access points 120 to respond to messages to that BSSID, with the effect that the control element 140 can alter the access point 120 servicing the mobile station 130, without that mobile station 130 knowing of the alteration.

In a 1st embodiment, sometimes called a "virtual cell" system, the same BSSID is shared among all of the mobile stations 130. In a 2nd embodiment, sometimes called a "virtual port" system, each mobile station 130 is assigned an BSSID which is individual to that mobile station 130. In either of these embodiments, each access point 120 maintains an ACK table 121, as described herein, which identifies those mobile stations 130 with which it is exchanging messages.

This has the effect that each mobile station 130 sees the communication system 100 as if there was only a single access point 120 servicing it at all times, the mobile station 130 being unable to determine which physical access point 120 is the one really servicing it, and being unable to determine when or whether it is transferred from a 1st to a 2nd access point 120. This has the effect that each mobile station having the perception that the system includes only a single access point and only a single cell rather than a multiplicity of separate cells.

When the control element 140 associates a mobile station 120 with an access point 120, the control element 140 informs the access point 120 of the BSSID maintained separately for that mobile station 120, and directs the access point 120 to respond to messages directed to that BSSID. The control element 140 also directs the access point 120 to acknowledge messages from that mobile station 130, and identifies that mobile station 130 to the access point 120 using the MAC address of that mobile station 130.

Each access point 120 maintains an ACK table 121, including the MAC address of each mobile station 130 which the access point 120 is servicing. When the access point 120 receives a message, it compares the MAC address for the message sender (which is present in the "sender" field of a header for the message 161) with the MAC addresses in the ACK table 121. If the message sender's MAC address matches any of the MAC addresses in the ACK table 121, the access point 120 responds with an ACK message 162.

Rogue Device Messages

Rogue devices are not authorized to use the communication system 100, but attempt to send messages 161 using the communication channel 110 without authorization. Rogue devices include rogue access points 151 and one or more rogue stations 152. For one example, a rogue station 152 might attempt to pretend that it is an authorized mobile station 130, with the aim of convincing access points 120 to route messages 161 on behalf of the rogue station 152. For another example, a rogue access point 151 might include a wireless router brought on premises without authorization, with the aim of routing messages 161 on behalf of rogue stations 152.

When a rogue station 152 sends a message 161, that message 161 is detected by one or more access points 120. Those access points 120 each determine if the message 161 includes a destination address equal to a BSSID maintained by the access point 120 as representing one of the mobile stations 130 serviced by that access point 120. To obtain a BSSID and be serviced by an access point 120, a mobile station 130 generally must obtain authorization (at a higher protocol level) to use the communication system 100. If the mobile station 130 is unable to obtain authorization, it would be unable to use the communication system 100 and its access points 120.

When an access point 120 detects a message 161 sent by a rogue station 152, that access point 120 can also determine whether the destination BSSID for the rogue message 161 is a valid BSSID associating that mobile station 130 with some access point 120. In one embodiment, if the access point 120 hearing the message 161 is not actually servicing that BSSID, it queries the control element 140 to determine if that BSSID is valid. If the BSSID is valid, each access point 120 hearing the message 161 lets the one proper access point 120 respond. If the BSSID is not valid, each access point 120 hearing the message 161 becomes aware that the device sending the message 161 is a rogue station 152.

When the access point 120 detects a rogue station 152, it reports that fact to the control element 140. In one embodiment, the control element 140 becomes aware of that fact when the access point 120 reports a BSSID which is not valid. The control element 140 can then inform access points 120 of the presence of a rogue station 152 attempting to use the communication system 100.

Identifying Rogue Devices

When the control element 140 becomes aware of a rogue station 152, it determines which access points 120 are within detection range of the rogue station 152. For example, the control element 140 can identify those access points 120 by noting which access points 120 report the presence of messages 161 having an invalid BSSID. In one embodiment, the control element 140 can make this determination in a similar manner as it determines which access points 120 are within detection range of mobile stations 130 when the latter move Once the control element 140 is informed of the presence of the rogue station 152, it maintains a record of the MAC address of that rogue station 152. In one embodiment, the control element 140 maintains an association table 121 which identifies, for each mobile station 130, a valid BSSID for that mobile station 130 and an identifier of which access point 120 is servicing that mobile station 130. For example, the control element 140 can add an entry to its association table 121 for the identified rogue station 152, identifying the MAC address for that rogue station 152, the invalid one or more BSSID's that rogue station 152 is using, and the fact that rogue station 152 is unauthorized. In alternative embodiments, the control element 140 may maintain a record of rogue stations 152 in a different data structure.

As described herein, when the rogue station 152 sends a message 161, those access points 120 hearing that message 161 report the destination BSSID to the control element 140. Similarly, those access points 120 hearing that message 161 report the sender's MAC address to the control element 140. This has the effect that the control element 140 is able to determine MAC addresses for rogue stations 152 that access points 120 detect. This has the effect that the control element 140 is able to maintain entries for rogue stations 152 in its association table 121, or, in alternative embodiments, in a different data structure.

When the control element 140 identifies a rogue station 152, it determines which access points 120 are within range to detect messages 161 sent by that rogue station 152. Similar to determining which access points 120 are within range of an authorized mobile station 130, the control element 140 can maintain a record of those access points 120 which report the presence of the device with that MAC address. If the MAC address is associated with an authorized device, the control element 140 notes that device is an authorized mobile station 130, and assures that it is associated with one selected access point 120. If the MAC address is associated with an unauthorized device, the control element 140 notes that the device is a rogue station 152, and takes action to prevent the rogue station 152 from further using the communication system 100.

Blocking Rogue Device Messages

When the control element 140 identifies a rogue station 152, it identifies one or more access points 120 within range to detect messages 161 sent by that rogue station 152, and directs those access points 120 to add the MAC address of that rogue station 152 to their ACK tables 121. In one embodiment, the control element 140 selects two such access points 120. While one such access point 120 could suffice, two are preferred because it is more likely that ACK messages 162 from those access points 120 will interfere with the rogue station 152, as described below. While more than two such access points 120 could make it more likely to interfere with the rogue station 152, two are sufficient, and it is not desirable to waste ACK table entries.

The selected access points 120, having entered the MAC address of the rogue station 152 in their ACK tables 121, will send ACK messages 162 whenever they detect a message 161 from the rogue station 152. When the rogue station 152 sends a message 161, the device designated as the recipient for that message 161 sends a regular ACK message 162 back to the rogue station 152 to indicate that the message 161 was received.

In the IEEE 802.11 protocol family, for many messages 161, the sending device expects to receive a responsive ACK message 162, and looks to receive that responsive ACK message 162 to assure itself that the message 161 has been received at the recipient device. This has the effect that when the rogue station 152 sends a message 161 to a rogue access point 151, the rogue access point 151 will send an ACK message 162 back to the rogue station 152. The rogue station 152 will expect this ACK message 162 from the rogue access point 151.

However, when the rogue station 152 sends a message 161 to the rogue access point 151, the selected access points 120 will also send ACK messages 162 whenever they detect that message 161. The ACK messages 162 from the selected access points 120 will most likely overlap in time with the ACK message 162 from the rogue access point 151, causing all overlapping messages 161 to have errors when received by the rogue station 152. This has the effect that the rogue station 152 will most likely not be able to receive any ACK message 162 in response to its message 161 to the rogue access point 151. Similarly, the rogue station 152 will most likely not be able to receive any ACK message 162 in response to its message 161 to any other device in the communication system 100.

When the rogue station 152 is unable to receive an ACK message 162, for many messages 161, the rogue station 152 will assume that its original message 161 was not properly received. It will wait some amount of time, and attempt to retransmit the original message 161. However, even if the attempt to retransmit is successful, the rogue station 152 will similarly not be able to receive any ACK message 162 for the retransmitted message. This has the effect that the rogue station 152 will repeatedly wait and retransmit, fail to receive an ACK message 162, again wait and retransmit, and again fail to receive an ACK message 162, until it times out the entire attempt to send the original message 161 and drops its connection with the rogue access point 151.

Since the rogue station 152 will not be able to reliably send any messages 161 to the rogue access point 151, the rogue station 152 is effectively blocked from communication within the communication system 100.

FIG. 2

Figure 2:
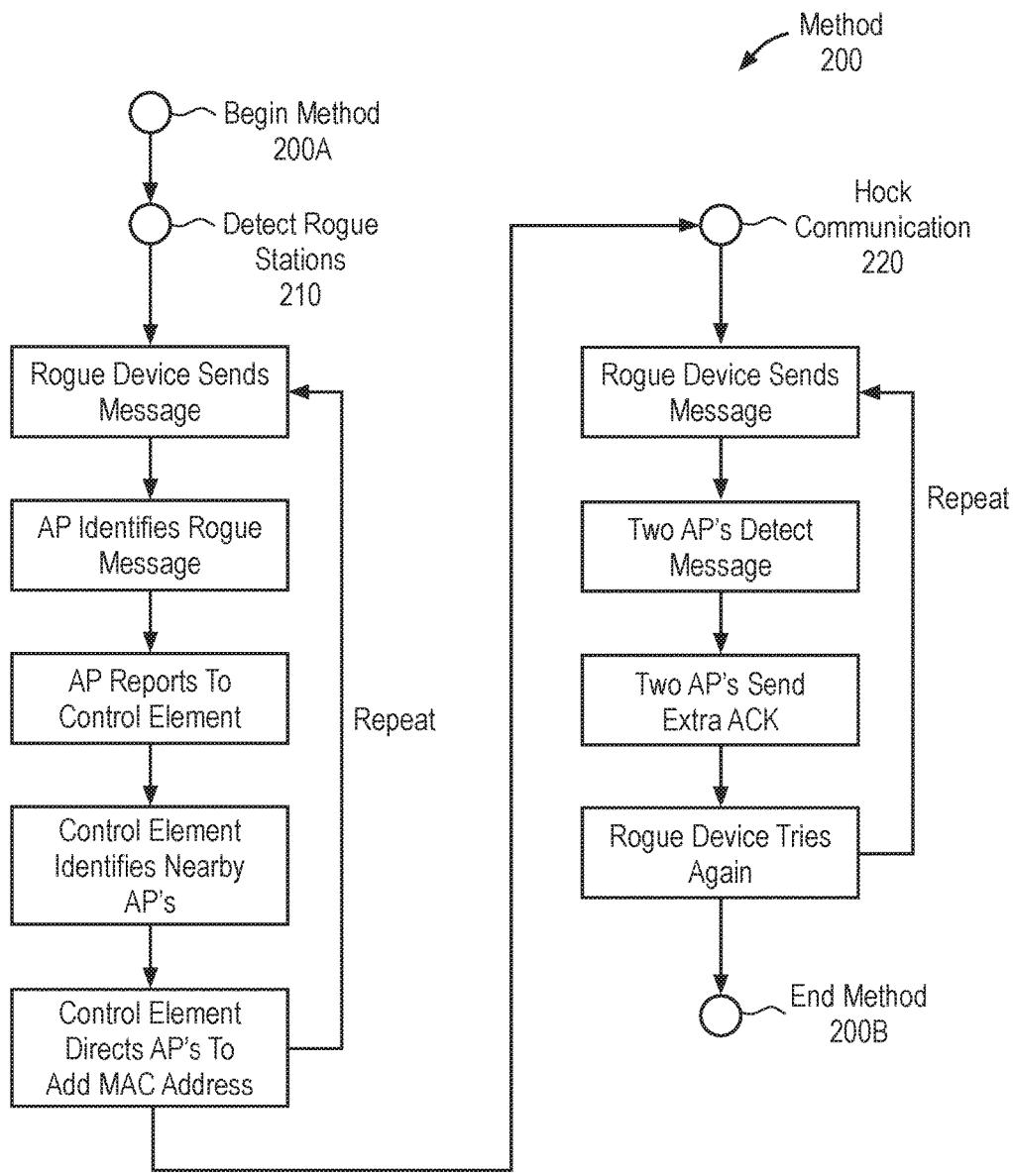
FIG. 2 shows a conceptual diagram of a method.

FIG. 2 shows a conceptual diagram of a method.

A method 200 includes flow points and method steps as shown in the figure, including at least those described below.

A flow point 200A indicates a beginning of the method 200.

A flow point 210 indicates that the method 200 is ready to detect rogue stations 152.

At a step 211, a rogue station 152 attempts to send a message 161 to another device using the communication system 100, such as for example a rogue access point 151.

At a step 212, a 1st nearby access point 120 detects the message 161 and identifies the message 161 as being directed to a BSSID other than itself.

At a step 213, the access point 120 detecting the message 161 reports the message 161 to the control element 140, which identifies the BSSID as not belonging to any access point 120 in the communication system 100. This has the effect that the control element 140 has identified the message 161 as coming from a rogue station 152. As part of this step, the control element 140 notes the MAC address of the rogue station 152.

At a step 214, the control element 140 identifies one or more access points 120 near the 1st nearby access point 120, and therefore near the rogue station 152. In one embodiment, the control element 140 identifies two such access points 120. For example, the control element 140 might identify those access points 120 by noting which access points 120 report the original message 161 from the rogue station 152.

At a step 215, the control station 140 directs the identified access points 120 to add the MAC address of the rogue station 152 to their ACK tables 121. The access points 120 comply.

In one embodiment, the method 200 repeats the step 211 through the step 215 until terminated by some extraordinary circumstance. This has the effect that the control element 140 continually identifies rogue stations 152 and adds their MAC addresses to ACK tables 121.

In one embodiment, the control element 140 can direct access points 120 to remove those MAC addresses from their ACK tables 121 when the rogue stations 152 with those MAC addresses have not been heard from for some time. Alternatively, access points 120 can remove those MAC addresses from their ACK tables 121 when the access points 120 have not detected any messages from the rogue stations 152 with those MAC addresses for some time.

A flow point 220 indicates that the method 200 is ready to block communication by rogue stations 152.

At a step 221, a rogue station 152 attempts to send a message 161 to a destination device using the communication system 100, such as for example a rogue access point 151. The destination device receives the message 161 and sends an ACK message 162 to the rogue station 152.

At a step 222, two access points 120 detect the message 161 from the rogue station 152 to its destination.

At a step 223, the two access points 120 detecting the message each send ACK messages 162 to the rogue station 152. This has the effect that the ACK message 162 from the destination is broken by one or more ACK messages 162 from the access points 120.

At a step 224, the rogue station 152, not having received an (unbroken) ACK message 162 from the destination, assumes that its original message 161 was not received. The rogue station 152 waits some amount of time and retries sending the original message. The method 200 returns to the step 221, where it repeats until the rogue station 152 gives up.

In one embodiment, the method 200 repeats the step 221 through the step 224 until terminated by some extraordinary circumstance. This has the effect that rogue stations 152 are effectively blocked from using the communication system 100.

A flow point 200B indicates an end of the method 200. In one embodiment, the method 200 is repeated from its beginning, the flow point 200A, until it is terminated by some extraordinary circumstance.

We claim:

1. A computer-implemented method in a control element responsible for a plurality of access points in a wireless communication network, the method for controlling rogue devices and including the steps of:
identifying a rogue device by the control element, comprising:
receiving a notification from an access point of the plurality of access points, of a detected frame associated with a BSSID (basic service set identifiers);
determining that the frame is directed to a BSSID that is not associated with the plurality of access points, and
identifying the BSSID as being associated with a rogue device;
receiving a MAC address of the rogue device from the access point;
determining from the MAC address that the rogue device has been an authorized device associated with at least one of the plurality of access points; and
blocking the rogue device by the access point as directed by the control element, comprising:
directing at least two access points of the plurality of access points to each send an ACK (acknowledgment) frame in response to the received frame sent by the rogue device, to interfere with an ACK frame sent to the rogue device from an unauthorized access point.

2. The method of claim 1, wherein the at least two access points includes the access point that detected the frame.

3. The method of claim 1, wherein the at least two access points does not include the access point that detected the frame.

4. The method of claim 1, further comprising:
determining which access points of the plurality of access points are within radio range of the rogue device, wherein the determination identifies that at least two access points of the plurality of access points are within radio range of the rogue device.

5. The method of claim 1, wherein blocking the rogue device further comprises:
sending a MAC address of the rogue device to the at least two access points.

6. The method of claim 1, wherein the blocking the rogue device further comprises:
wherein the at least two access points store the MAC address of the rogue device in ACK tables.

7. The method of claim 1, wherein blocking the rogue device further comprises:
directing at least two access points of the plurality of access points to each send an ACK (acknowledgment) frame in response to any additional frame sent by the rogue device, to interfere with an ACK frame sent to the rogue device from an unauthorized access point.

8. The method of claim 1, wherein the rogue device is communicating with the rogue access point using the IEEE 802.11w protocol which secures management frames between the rogue device and the rogue access point.

9. The method of claim 1, wherein the rogue device is communicating with the rogue access point using a protocol that prevents a de-authorization message from being effective to disconnect the rogue device from the rogue access point.

10. A non-transitory computer-readable medium storing code that, when executed by a processor, perform a method in a control element responsible for a plurality of access points in a wireless communication network, the method for controlling rogue devices and including the steps of:
identifying a rogue device by the control element, comprising:
receiving a notification from an access point of the plurality of access points, of a detected frame associated with a BSSID (basic service set identifiers);
determining that the frame is directed to a BSSID that is not associated with the plurality of access points, and identifying the BSSID as being associated with a rogue device;

receiving a MAC address of the rogue device from the access point;

determining from the MAC address that the rogue device has been an authorized device associated with at least one of the plurality of access points; and blocking the rogue device by the access point as directed by the control element, comprising:

directing at least two access points of the plurality of access points to each send an ACK (acknowledgment) frame in response to the received frame sent by the rogue device, to interfere with an ACK frame sent to the rogue device from an unauthorized access point.

11. A computer-implemented method in an access point for controlling rogue devices and including the steps of:

identifying a rogue device by the control element, comprising:

detecting a frame associated with a BSSID (basic service set identifiers) that is not associated with the access point;

notifying a control element responsible for managing a plurality of access points including the access point, of the detected frame;

receiving a notification from the control element that the frame is directed to a BSSID that is not associated with the plurality of access points, wherein the control element notifies at least one other access point from the plurality of access points of the detected frame;

receiving a MAC address of the rogue device from the access point;

determining from the MAC address that the rogue device has been an authorized device associated with at least one of the plurality of access points; and blocking the rogue device by the access point as directed by the control element, comprising:

sending an ACK (acknowledgment) frame in response to the received frame sent by the rogue device, to interfere with an ACK frame sent to the rogue device from an unauthorized access point, wherein the at least one other access point also sends an ACK frame.

* * * * *